United States Patent
Conley, Jr. et al.

(10) Patent No.: US 7,620,828 B2
(45) Date of Patent: Nov. 17, 2009

(54) DYNAMICALLY CHANGING PCI CLOCKS

(75) Inventors: Christopher R. Conley, Jr., Pflugerville, TX (US); Michael Criscolo, Cedar Park, TX (US); Michael T. Saunders, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/187,202

(22) Filed: Aug. 6, 2008

(65) Prior Publication Data

US 2008/0294822 A1 Nov. 27, 2008

Related U.S. Application Data

(63) Continuation of application No. 11/221,552, filed on Sep. 8, 2005, now Pat. No. 7,457,974.

(51) Int. Cl.
*G06F 13/00* (2006.01)

(52) U.S. Cl. ........................ 713/300; 713/310; 713/320; 713/321; 713/322; 713/323; 713/324; 713/330; 713/340; 713/600; 713/601

(58) Field of Classification Search ................ 713/300, 713/310, 320–324, 330, 340, 600, 601
See application file for complete search history.

(56) References Cited

U.S. PATENT DOCUMENTS 5,517,460 A * 5/1996 Yamaguchi ............ 365/233.16
7,457,974 B2 * 11/2008 Conley et al. ............... 713/322

* cited by examiner

*Primary Examiner*—Abdelmoniem Elamin
(74) *Attorney, Agent, or Firm*—Dillon & Yudell LLP

(57) ABSTRACT

A method, apparatus and computer-usable medium are presented for dynamically selecting a clock signal used by a peripheral device that is coupled to a motherboard. When the motherboard is powered off, a clock selector sends the peripheral device an internal clock signal from the peripheral device's own internal clock controller. When the motherboard powers up, the clock selector sends the peripheral device an external clock signal from the motherboard.

20 Claims, 15 Drawing Sheets

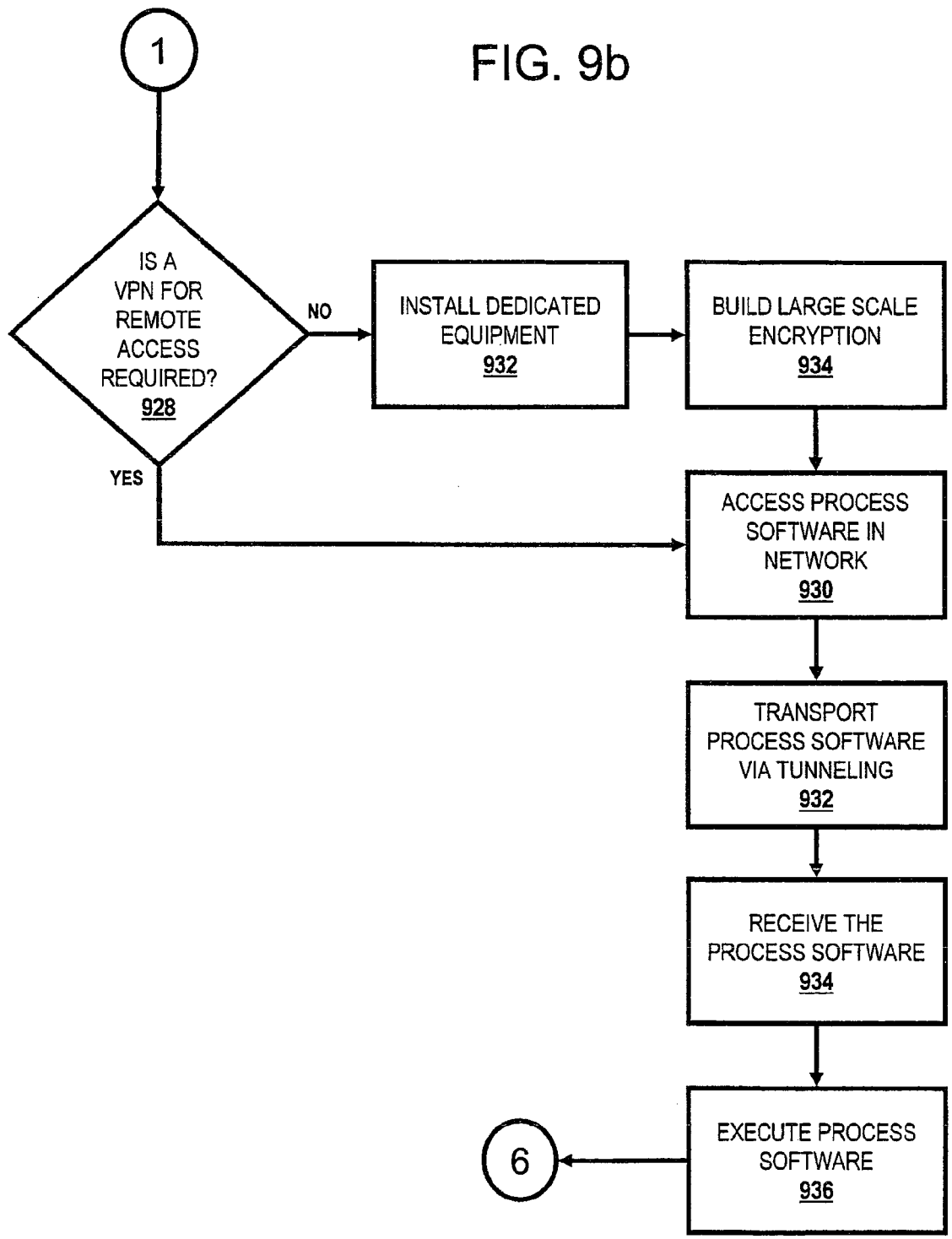

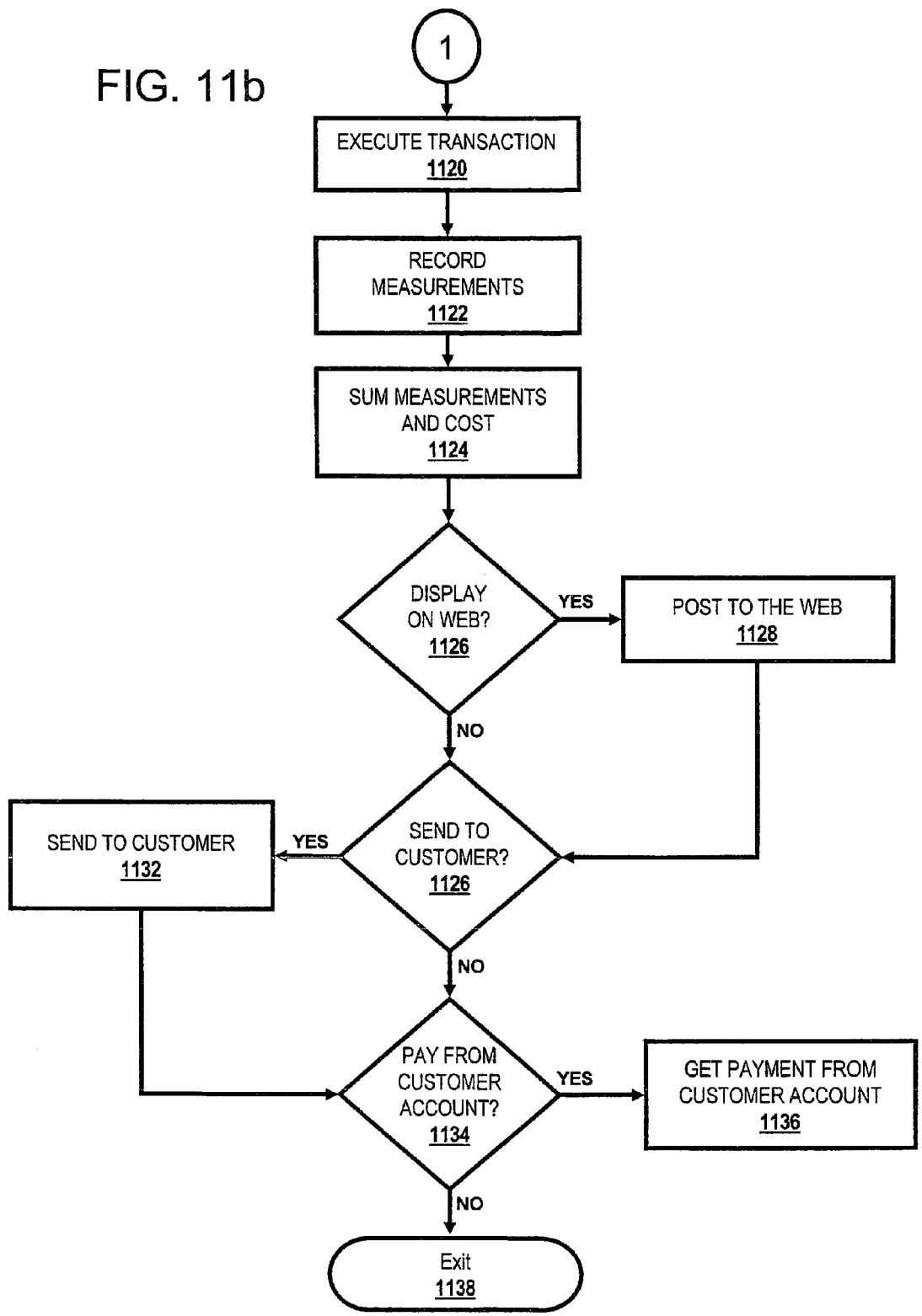

DYNAMICALLY CHANGING PCI CLOCKS

PRIORITY CLAIM

The present application is a continuation of U.S. patent application Ser. No. 11/221,552, titled "Dynamically Changing PCI Clocks," filed on September, the contents of which is incorporated herein by reference in its entirety.

BACKGROUND OF THE INVENTION

1. Technical Field

The present invention relates in general to the field of computers, and in particular to computers having peripheral devices attached to a motherboard in the computer. Still more particularly, the present invention relates to a method and system for the peripheral device to switch from an internal local clock signal to an external master clock signal that is generated by the motherboard.

2. Description of the Related Art

Modern electronic devices such as computers often have peripheral devices associated with them. One such peripheral device is a controller card, which is used to control operations of one or more motherboards. In order to be able to control the motherboards regardless of whether the motherboard is powered up or not, such controller cards often have an on-board controller chip.

FIG. 1 depicts a typical peripheral device, which is shown for exemplary purposes as a Peripheral Component Interconnect (PCI) card 102, which is compliant with the PCI Local Bus Specification published by the PCI Special Interest Group of Hillsboro, Oreg. PCI card 102 has a primary PCI bus 104 on which outbound data is sent, a secondary PCI bus 106 for receiving inbound data, and a PCI controller chip 108 that provides a PCI clock signal to both PCI busses (104 and 106) in PCI card 102. Note that without a PCI clock signal, PCI busses 104 and 106 are disabled, thus making it impossible to configure/use PCI card 102.

PCI card 102 is typically coupled via PCI slots to a motherboard. When the motherboard is turned off, the PCI card 102 is in a "stand alone" (autonomous) mode, having its own power and being controlled by its own PCI controller chip 108, shown in FIG. 1. However, when the motherboard, to which PCI card 102 is attached, is powered up, then the motherboard will typically assert control over the PCI card 102, including an assertion of a master clock signal. For example, as shown in FIG. 2, a motherboard 202 is coupled to PCI card 102 via a PCI slot 204 and a PCI connector 206. When motherboard 202 powers up, motherboard's PCI controller chip 208 sends a PCI clock signal (along with a synchronization reset signal) to all PCI devices coupled to motherboard 202, including PCI card 102. PCI card 102's PCI busses 104 and 106 then experience "clock collision." That is, PCI busses 104 and 106 are receiving competing PCI clock signals (internally from PCI controller chip 108 and externally from PCI controller chip 208). This causes PCI card 102's busses to malfunction.

SUMMARY OF THE INVENTION

To address the problem described in the prior art, a method, apparatus and computer-usable medium are presented for dynamically selecting a clock signal used by a peripheral device that is coupled to a motherboard. When the motherboard is powered off, a clock selector sends the peripheral device an internal clock signal from the peripheral device's own internal clock controller. When the motherboard is powered on, the clock selector sends the peripheral device an external clock signal from the motherboard.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 4a illustrates a hardware circuit used in a preferred embodiment of the presently presented system for dynamically controlling which PCI clock is used by the PCI card;

FIGS. 4b-c depict state tables for the circuit shown in FIG. 4a;

FIGS. 9a-c show a flow-chart of steps taken to deploy in a Virtual Private Network (VPN) software that is capable of executing the steps shown and described in FIG. 6;

FIGS. 11a-b show a flow-chart showing steps taken to execute the steps shown and described in FIG. 6 using an on-demand service provider.

DETAILED DESCRIPTION OF THE PREFERRED EMBODIMENT

Figure 1:
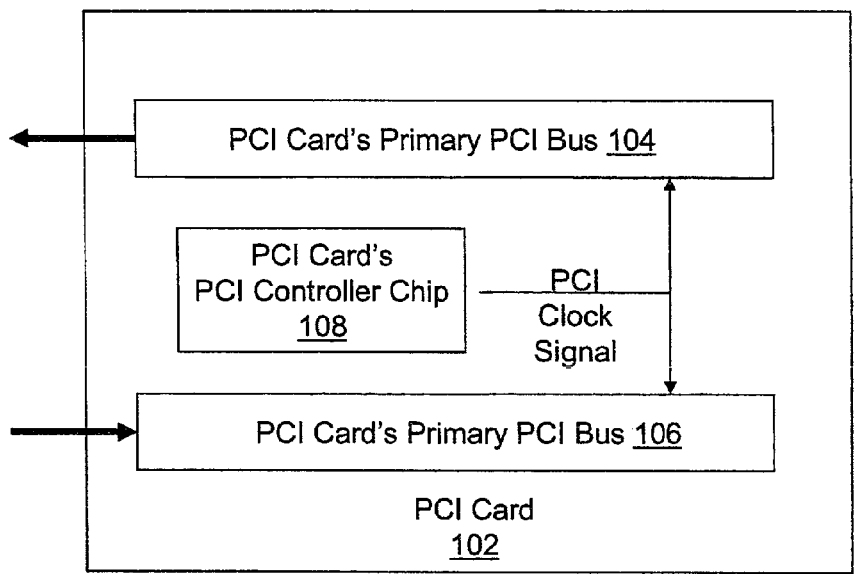
FIG. 1 illustrates a prior art Peripheral Component Interconnect (PCI) card.
Figure 2:
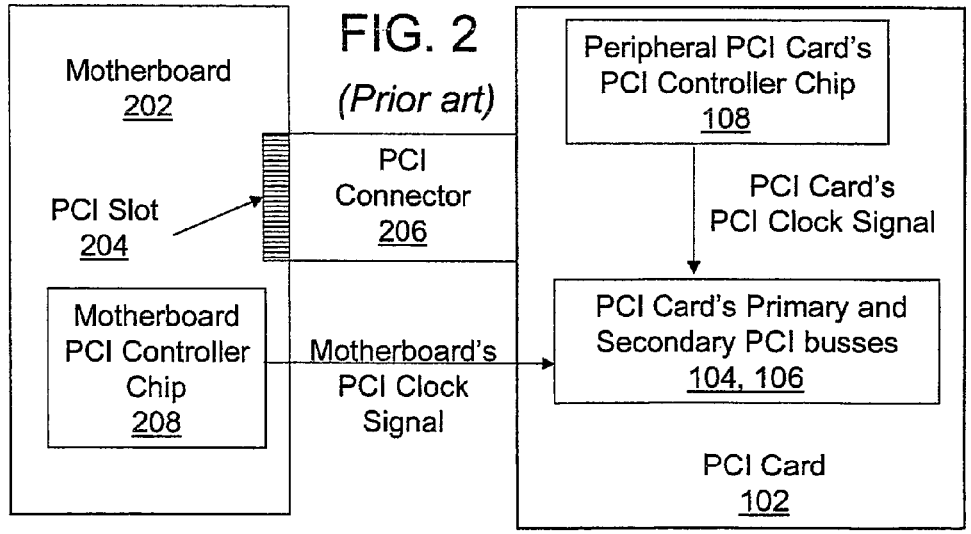
FIG. 2 depicts a prior art connection between a motherboard and the PCI card shown in FIG. 1.
Figure 3:
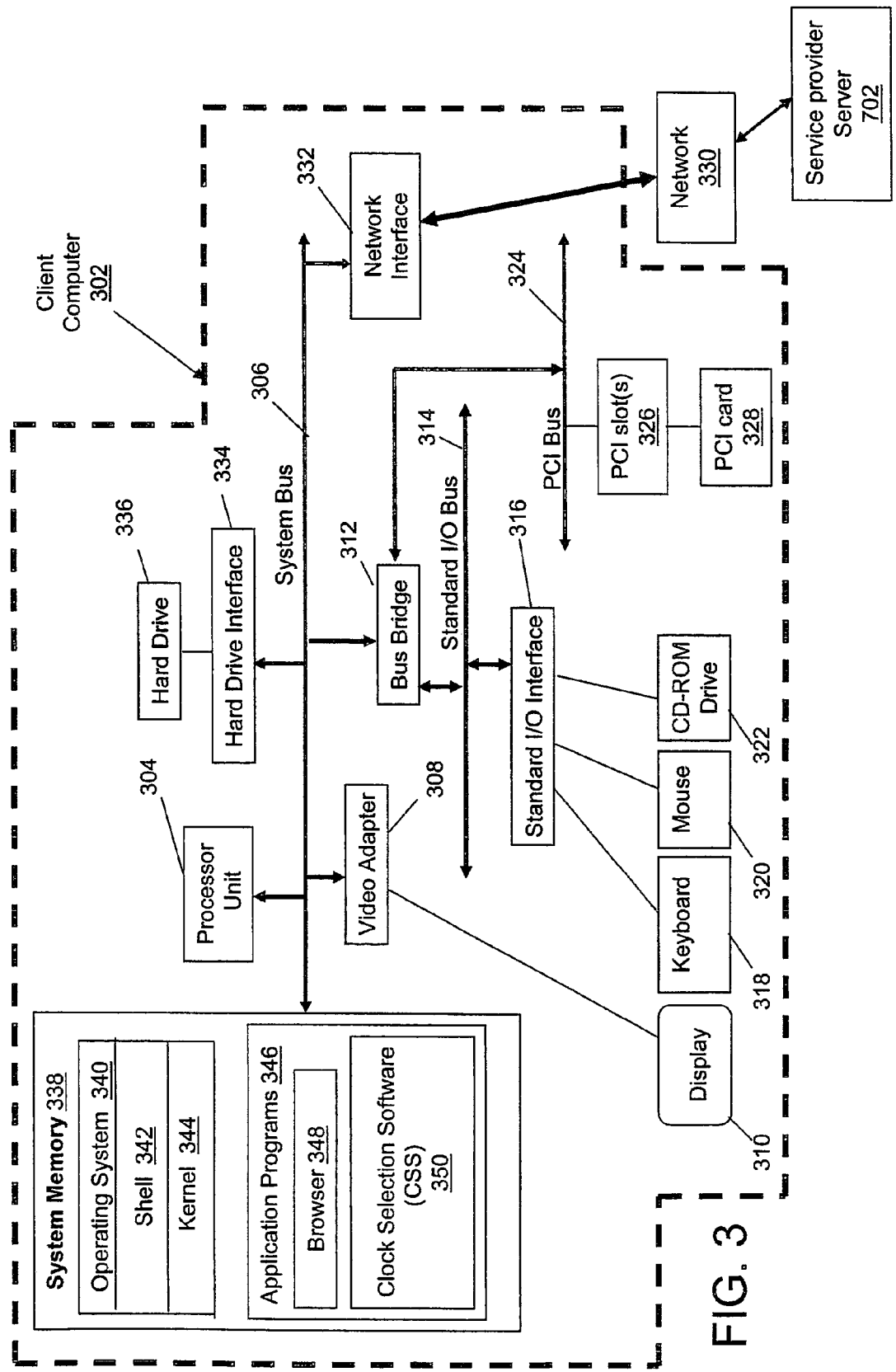
FIG. 3 illustrates an exemplary computer on which the present method and system can be used to dynamically change which PCI clock is used by a peripheral PCI card.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to a standard Input/Output (I/O) bus 314. A standard I/O interface 316 is coupled to standard I/O bus 314. Standard I/O interface 316 affords communication with various I/O devices, including a keyboard 318, a mouse 320, and a Compact Disk-Read Only Memory (CD-ROM) drive 322. The format of the ports connected to standard I/O interface 316 may be any known to those skilled in the art of computer architecture, including but not limited to Universal Serial Bus (USB) ports.

A Peripheral Component Interconnect (PCI) bus 324 is also coupled to bridge bus 312. One or more PCI slots 326 are coupled to PCI bus 324. Each PCI slot 326 is capable of being coupled to a different PCI card 328.

Client computer 302 is able to communicate with a service provider server 702 via a network 330 using a network interface 332, which is coupled to system bus 306. Preferably, network 330 is the Internet.

A hard drive interface 334 is also coupled to system bus 306. Hard drive interface 334 interfaces with a hard drive 336. In a preferred embodiment, hard drive 336 populates a system memory 338, which is also coupled to system bus 306. Data that populates system memory 338 includes client computer 302's operating system (OS) 340 and application programs 346.

OS 340 includes a shell 342, for providing transparent user access to resources such as application programs 346. Generally, shell 342 is a program that provides an interpreter and an interface between the user and the operating system. More specifically, shell 342 executes commands that are entered into a command line user interface or from a file. Thus, shell 342 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 344) for processing.

As depicted, OS 340 also includes kernel 344, which includes lower levels of functionality for OS 340, including providing essential services required by other parts of OS 340 and application programs 346, including memory management, process and task management, disk management, and mouse and keyboard management.

Application programs 346 include a browser 348. Browser 348 includes program modules and instructions enabling a World Wide Web (WWW) client (i.e., client computer 302) to send and receive network messages to the Internet using HyperText Transfer Protocol (HTTP) messaging, thus enabling communication with service provider server 702.

Application programs 346 in client computer 302's system memory also include a Clock Selection Software (CSS) 350. CSS 350 includes code for controlling inputs to hardware components such as AND gate 414 and clock buffer 416 shown in FIG. 4a. Alternatively, CSS 350 can include code used to emulate in software some or all of the hardware shown in FIG. 4a, including but not limited to motherboard PCI controller 410, AND gate 414, clock buffer 416, and PCI card's PCI controller 402. CSS 350 can also be used to simulate and/or generate signals such as the reset, power, and clock signals shown in FIG. 4a. In one embodiment, client computer 302 is able to download CSS 350 from service provider server 702.

The hardware elements depicted in client computer 302 are not intended to be exhaustive, but rather are representative to highlight essential components required by the present invention. For instance, client computer 302 may include alternate memory storage devices such as floppy disk drives, magnetic cassettes, Digital Versatile Disks (DVDs), Bernoulli cartridges, and the like. These and other variations are intended to be within the spirit and scope of the present invention.

Figure 4:
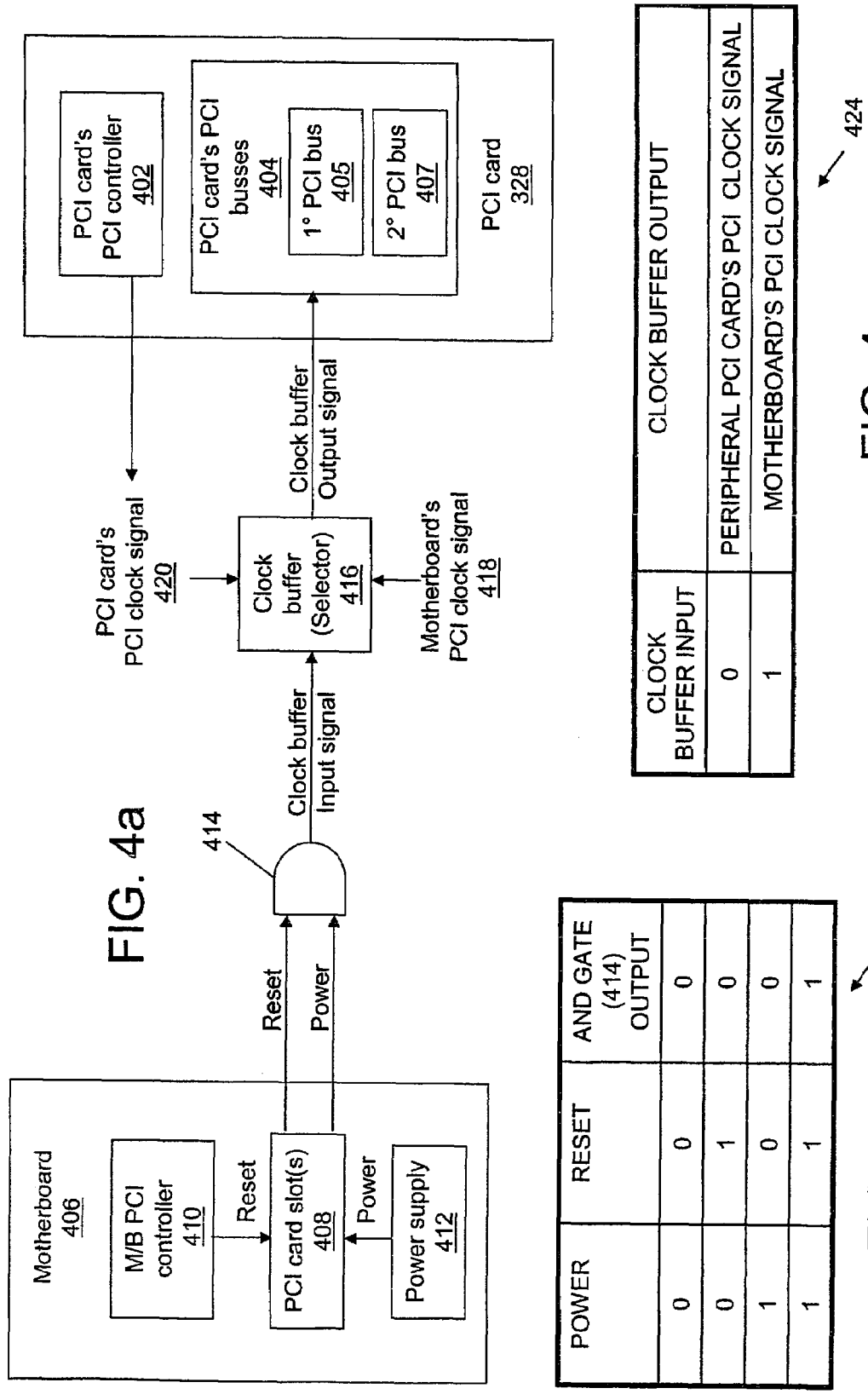

With reference now to FIG. 4a, there is depicted a block diagram of hardware used in a preferred embodiment to dynamically control which PCI clock signal is used by a PCI card 328. PCI card 328 includes PCI busses 404, which include a primary PCI bus 405 for signals leaving PCI card 328 and a secondary PCI bus 407 for signals coming into PCI card 328. PCI card 328 has a PCI controller 402, which is capable of producing a PCI clock signal 420. While PCI card 328 is preferably connected to a motherboard 406 via a PCI card slot 408, alternatively PCI card 328 may be freestanding as shown in FIG. 4a.

Motherboard 406 includes a PCI controller 410 and a power supply 412, both of which have connections to PCI card slots 408. Thus, pins from a PCI card slot 408 dedicated to PCI card 328 provide a "reset" and "power" signal to a Boolean logic such as AND gate 414. AND gate 414 has an output that provides a clock buffer input signal to clock buffer 416, which selects either PCI card 328's PCI clock signal 420 or motherboard 406's PCI clock signal 418 as the clock output signal going to PCI card 328's PCI busses 404.

The decision as to which PCI clock signal to use depends on the inputs to AND gate 414. As shown in FIG. 4b, the output from AND gate 414 is always logically low unless the reset signal and power signal from motherboard 406 are both high. That is, AND gate 414 outputs a logic high (logically active signal) only when motherboard 406 (including PCI card slots 408) is powered on, and when motherboard 406's PCI controller 410 issues a "reset" signal. The "reset" signal from motherboard 406 instructs all PCI peripheral devices to reset, thus synchronizing their operations according to the master PCI clock generated by PCI controller 410 on motherboard 406. Thus, only when PCI controller 410 is ready (powered on and issuing a reset command) to assume a "master" status over all peripheral PCI devices and cards will the output of AND gate 414 be logically high. If PCI controller 410 is not ready to assume such master status, then the output of AND gate 414 is logically low (logically active signal).

As shown in FIG. 4c, when the output of AND gate 414 is logically low (0), the clock buffer 416 selects PCI card 328's PCI clock signal 420 (generated by PCI controller 402) as the clock signal used by PCI busses 404. That is, if motherboard 406 is either not powered up or PCI controller 410 has not issued a reset signal, then PCI card 328 and its PCI busses 404 use the internally generated PCI clock signal 420 from PCI controller 402, thus allowing PCI card 328 to perform operations such as control of start-up and I/O operations for motherboard 406 even when motherboard 406 is turned off.

When the output of AND gate 414 is logically high (1), then clock buffer 416 quits sending PCI clock signal 420 to PCI busses 404, and starts sending motherboard 406's PCI clock signal 418 to PCI busses 404. That is, when motherboard 406 powers up and issues a reset signal from PCI controller 410, then motherboard 406 assumes its master status over PCI card 328, which master status includes the right to impose a master PCI clock signal 418 on PCI busses 404 to permit PCI synchronization as required by the PCI Local Bus Specification, Revision 2.2, Dec. 18, 1998, Section 4.2.3, published by the PCI Special Interest Group.

Thus, FIGS. 4a-c depict a system for dynamically controlling a clock signal used by a peripheral device (PCI card 328) that is coupled to a master device (motherboard 406) using a clock selector (clock buffer 416). The clock selector has a first clock signal input (PCI clock signal 418), a second clock signal input (PCI clock signal 420), a control input (the output of AND gate 414), and a clock signal output (the output of clock buffer 416). Note that PCI card 328 may be capable of controlling functionality of motherboard 406, including but not limited to waking up motherboard 406 in a Wake-On- LAN (WOL) system, powering on motherboard 406, and controlling incoming and outgoing data signals to motherboard 406.

Figure 5:
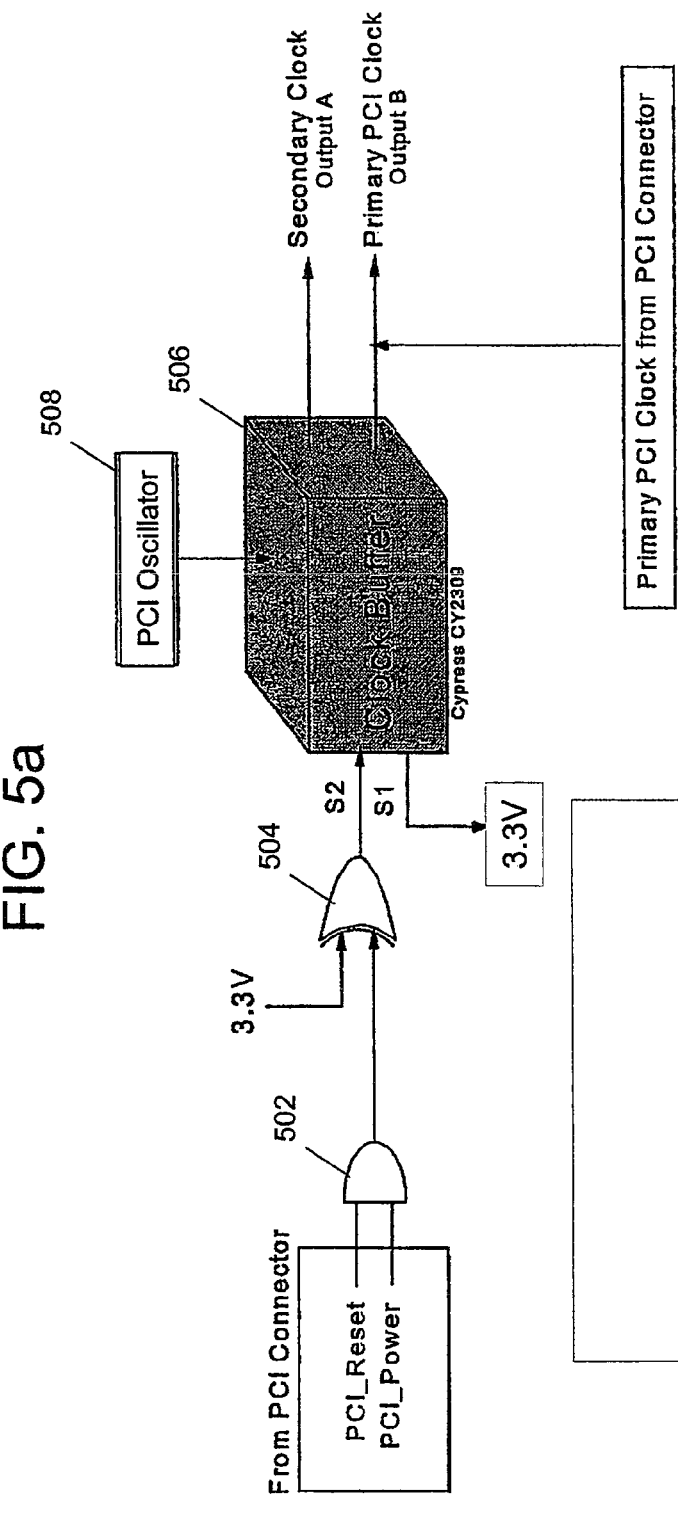
FIG. 5a illustrates an alternate hardware circuit used by the presently presented system for dynamically changing which PCI clock is used by the PCI card.
FIG. 5b is a state table for a clock buffer shown in FIG. 5b.

Referring now to FIG. 5*a*, an alternate preferred embodiment of hardware used by the present invention is presented. From a PCI connector slot (such as PCI card slot 408 shown in FIG. 4*a*), a PCI_Reset and PCI_Power signal are input into a Boolean logic such as an AND gate 502. The output of AND gate 502 is sent to a first input of an exclusive OR (XOR) gate 504, which has a second input tied to a logical high voltage (e.g., 3.3V). This provides the advantage of an output from XOR gate 504 being stable, and thus providing a stable select signal to an input S2 of a clock buffer 506. Note that the clock buffer 506 depicted is a Cypress CY2309 manufactured by Cypress Semiconductor™ of San Jose, Calif. The Cypress CY2309 is used in the alternate preferred embodiment due to its use of a PCI and SDRAM buffer in a single 8-pin SOIC package, thus providing a low-power and small platform unit. Note that the S1 input to clock buffer 506 is tied to a logically high voltage, in order to prevent S1 (the second input of the control dual-input) from "floating."

FIG. 5*b* shows a state table for Output A and Output B from clock buffer 506. Output A is a secondary clock signal generated by the PCI card using a PCI oscillator 508. Output B is a master primary clock signal generated by the motherboard using PCI oscillator 508, which inputs an oscillator signal into an oscillator signal input (not shown) in clock buffer 506. When either the PCI_Reset or PCI_Power signal is "low," then the output from AND gate 502 is low (a logical active signal), and the output of XOR gate 504 is high (also a logically active signal). This results in the input to S2 being high, causing the Primary PCI clock signal (Output B) to remain in a neutral 3-State while the PCI card's internal PCI clock signal (Output A) continues to be driven. Conversely, when the output of XOR gate 504 is low (due to PCI_Reset and PCI_Power both being high), then the PCI card's internal clock (Output A) is put into a neutral 3-State mode while Output B is driven by the motherboard using PCI oscillator 508.

Note that for the configuration shown in FIG. 5*a* using the Cypress CY2309 chip, Output A is driven for all conditions, since S1 is tied high. Thus, while the secondary clock is always turned on, the primary clock is controlled by the condition/state of the motherboard as described above.

Figure 6:
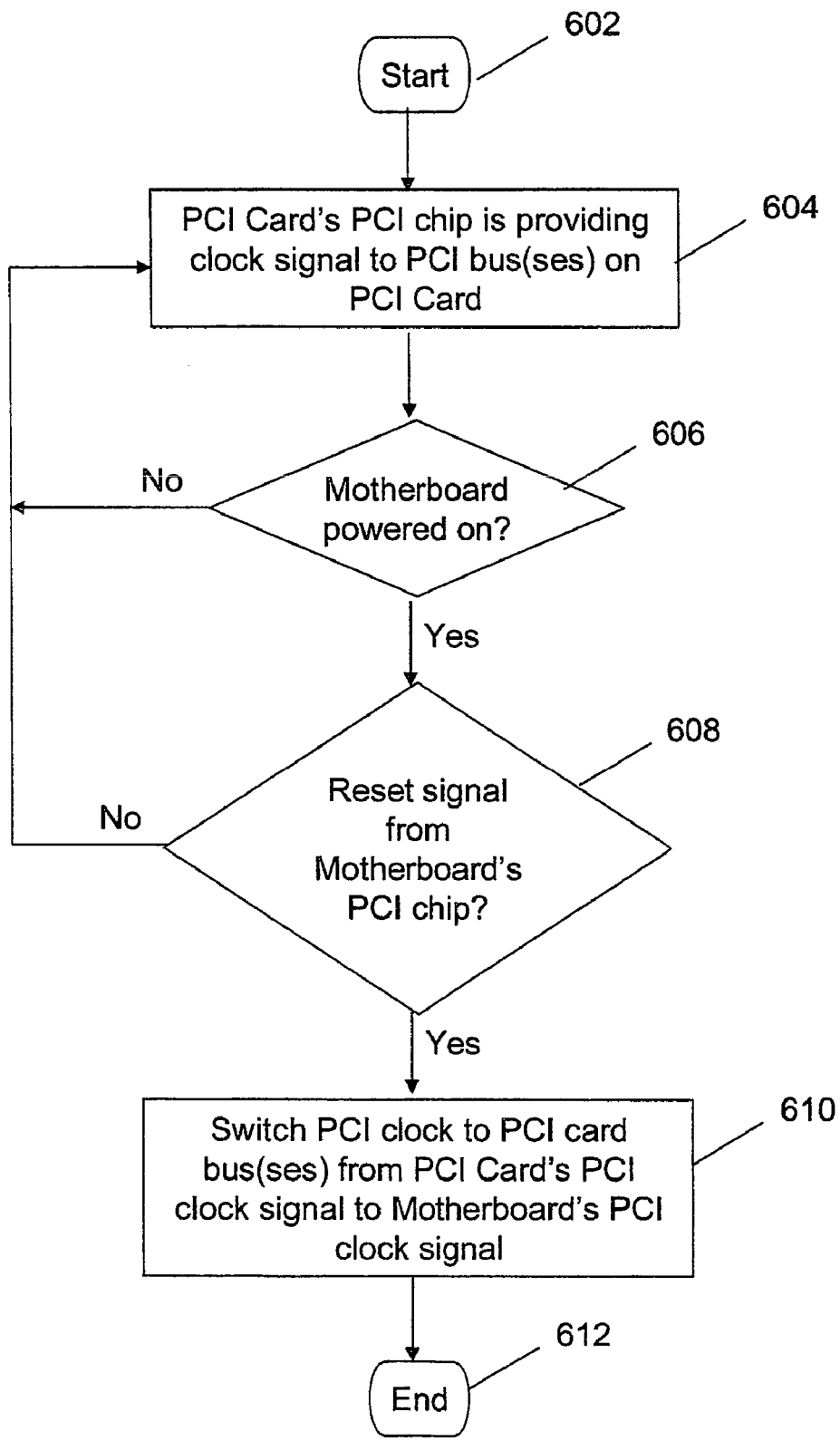
FIG. 6 is a flow-chart of exemplary steps taken by the present method, system and computer-usable medium for dynamically controlling which PCI clock is used by the PCI card.

Referring now to FIG. 6, a flow-chart of exemplary steps taken by the present invention is presented. After initiator block 602, an initial condition is set in which the peripheral PCI card's own PCI chip provides a PCI clock signal to the PCI busses on the PCI card (block 604). A query is then made as to whether the motherboard to which the PCI card is associated is powered on (query block 606). If so, then a query is made as to whether the motherboard has issued a "reset" signal to coordinate the operation of all PCI cards associated with the motherboard according to the motherboard's own PCI clock (query block 608). If so (the motherboard is powered on and is issuing a "reset" signal), then the PCI card stops using its own internal PCI clock signal and switches to the use of the PCI clock signal from the motherboard (block 610), as described above. The process ends at terminator block 612.

Figure 7:
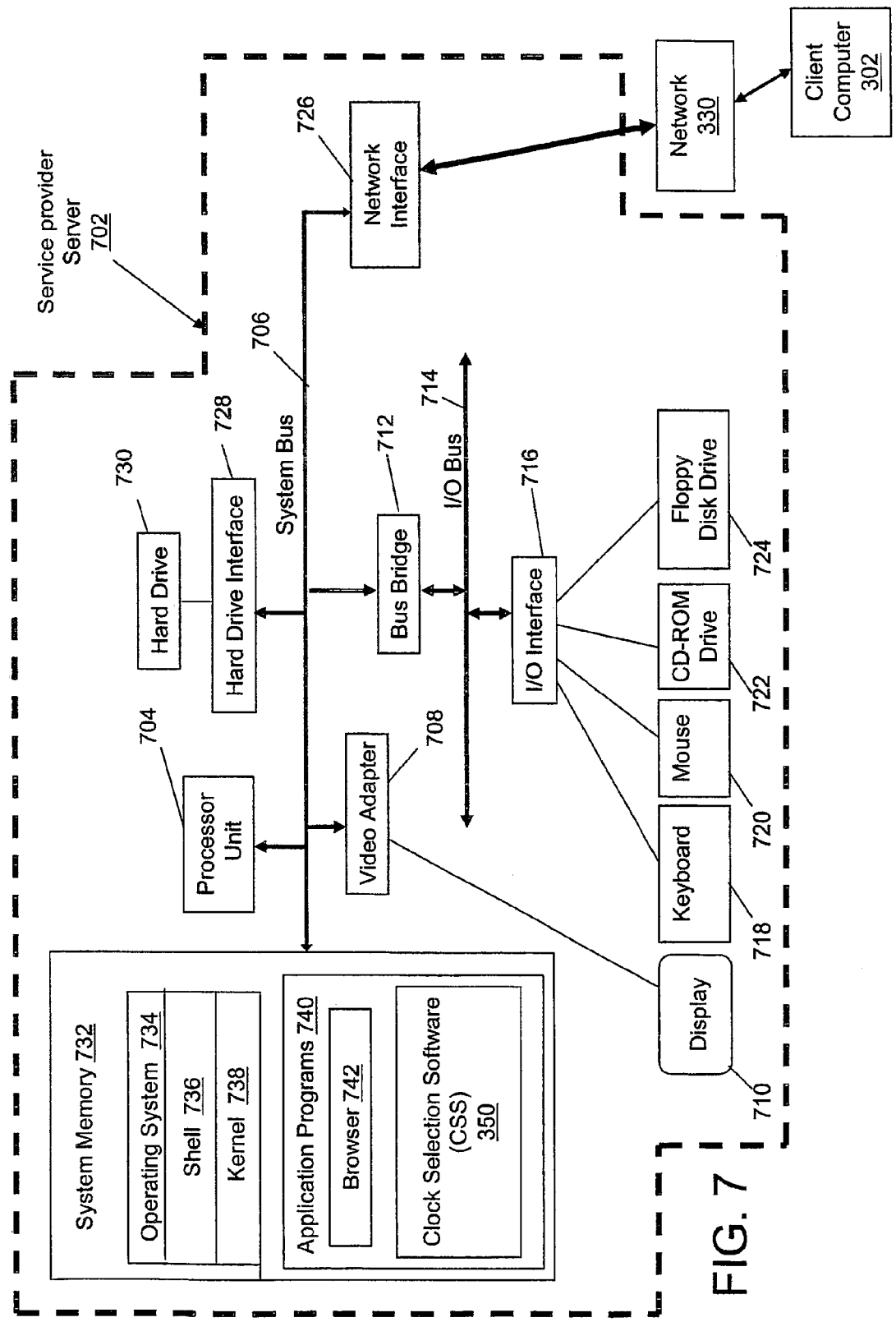
FIG. 7 depicts an exemplary service provider server that can deploy software used to dynamically change which PCI clock is used by the PCI card.

As stated above, CSS 350 (described above and depicted in FIG. 3) can be used to control inputs to hardware components such as AND gate 414 and clock buffer 416 shown in FIG. 4*a*, as well as emulate some or all of the physical hardware shown in FIG. 4*a*. This software CSS 350 can be downloaded to client computer 302 from service provider server 702, shown in exemplary form in FIG. 7. Service provider server 702 includes a processor unit 704 that is coupled to a system bus 706. A video adapter 708 is also coupled to system bus 706. Video adapter 708 drives/supports a display 710. System bus 706 is coupled via a bus bridge 712 to an Input/Output (I/O) bus 714. An I/O interface 716 is coupled to I/O bus 714. I/O interface 716 affords communication with various I/O devices, including a keyboard 718, a mouse 720, a Compact Disk-Read Only Memory (CD-ROM) drive 722, and a floppy disk drive 724. The format of the ports connected to I/O interface 716 may be any known to those skilled in the art of computer architecture, including but not limited to Universal Serial Bus (USB) ports.

Service provider server 702 is able to communicate with client computer 302 via network 330 using a network interface 726, which is coupled to system bus 706.

System bus 706 is also coupled to a hard drive interface 728, which interfaces with a hard drive 730. In a preferred embodiment, hard drive 730 populates a system memory 732, which is also coupled to system bus 706. Data that populates system memory 732 includes service provider server 702's operating system 734, which includes a shell 736 and a kernel 738. Shell 736 is incorporated in a higher level operating system layer and utilized for providing transparent user access to resources such as application programs 740, which include a browser 742, and a copy of CSS 350 described above.

The hardware elements depicted in service provider server 702 are not intended to be exhaustive, but rather are representative to highlight essential components required by the present invention. For instance, service provider server 702 may include alternate memory storage devices such as flash drives, magnetic cassettes, Digital Versatile Disks (DVDs), Bernoulli cartridges, and the like. These and other variations are intended to be within the spirit and scope of the present invention.

It should be understood that at least some aspects of the present invention may alternatively be implemented in a computer-useable medium that contains a program product that includes computer executable instructions configured to perform the steps described herein. Programs defining functions on the present invention can be delivered to a data storage system or a computer system via a variety of signal-bearing media, which include, without limitation, non-writable storage media (e.g., CD-ROM), tangible writable storage media (e.g., a floppy diskette, hard disk drive, read/write CD ROM, optical media), and communication media, such as computer and telephone networks including Ethernet. It should be understood, therefore, that such signal-bearing media, when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Figure 8A:
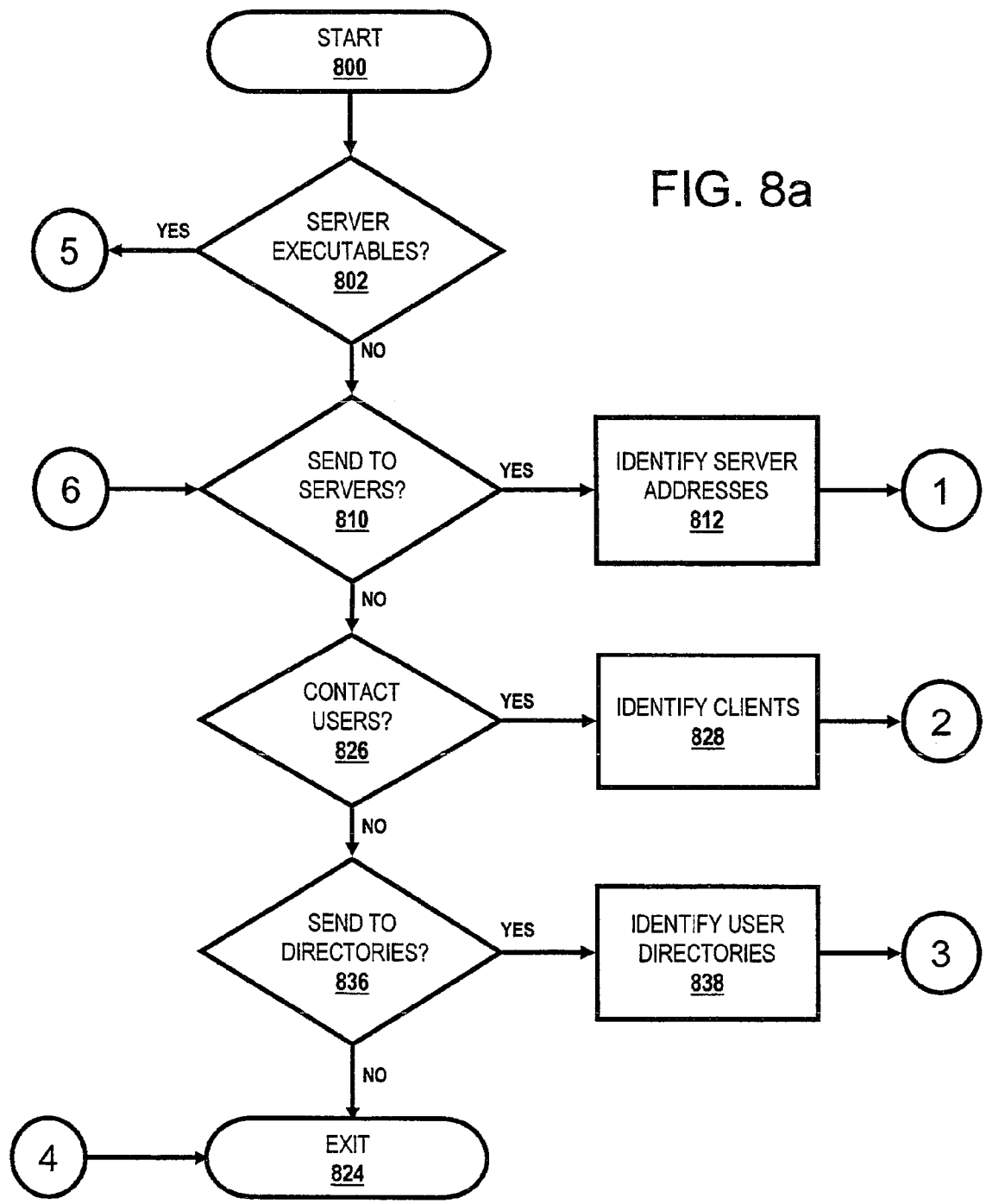
FIGS. 8a-b show a flow-chart of steps taken to deploy software capable of executing the steps shown and described in FIG. 6.
Figure 8B:
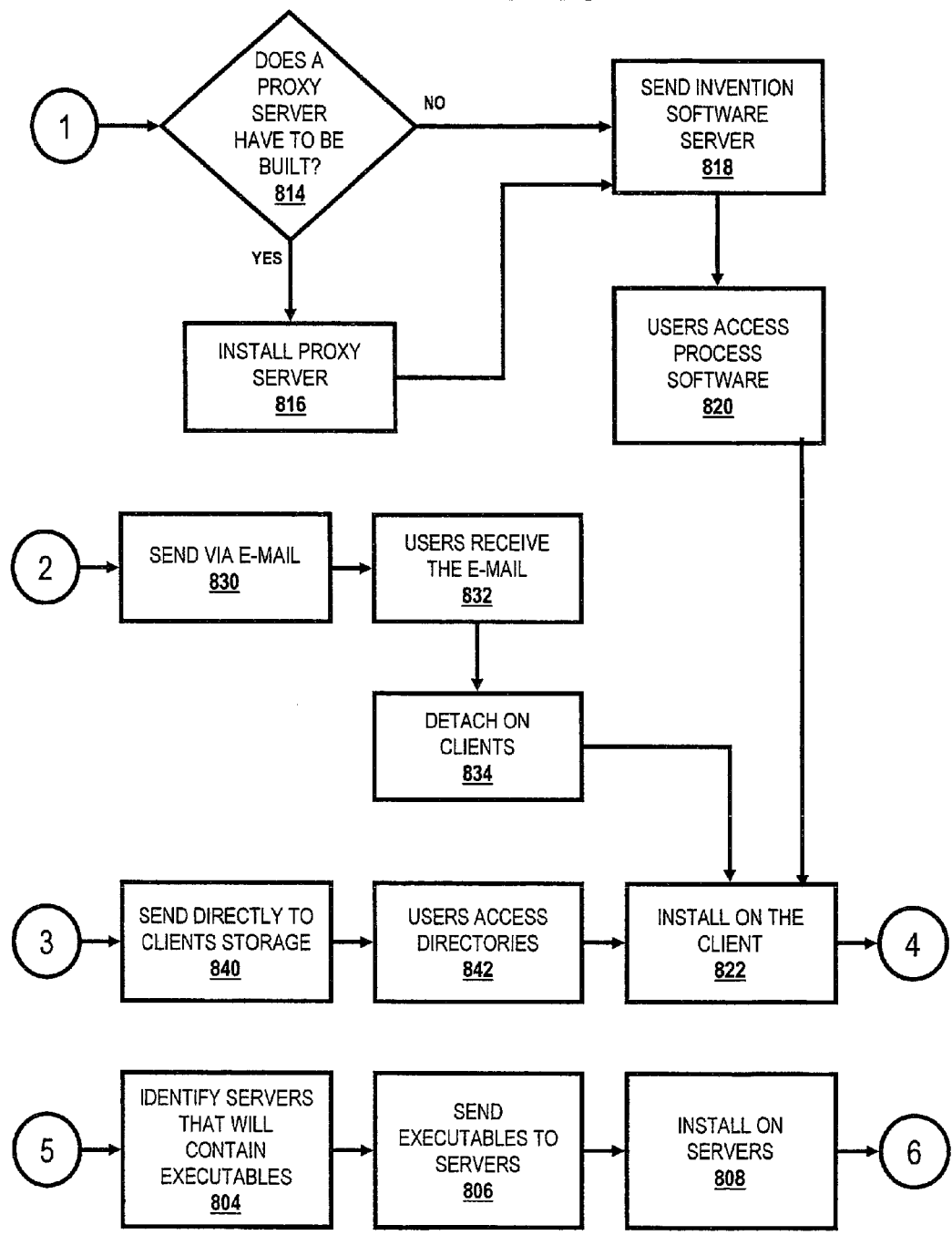

Thus, the method described herein, and in particular as shown and described in FIG. 6, can be deployed as a process software from service provider server 702 to client computer 302. Referring then to FIG. 8, step 800 begins the deployment of the process software. The first thing is to determine if there are any programs that will reside on a server or servers when the process software is executed (query block 802). If this is the case, then the servers that will contain the executables are identified (block 804). The process software for the server or servers is transferred directly to the servers' storage via File Transfer Protocol (FTP) or some other protocol or by copying though the use of a shared file system (block 806). The process software is then installed on the servers (block 808).

Next, a determination is made on whether the process software is be deployed by having users access the process software on a server or servers (query block 810). If the users are to access the process software on servers, then the server addresses that will store the process software are identified (block 812).

A determination is made if a proxy server is to be built (query block 814) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 816). The process software is sent to the servers either via a protocol such as FTP or it is copied directly from the source files to the server files via file sharing (block 818). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 820). Another embodiment is to have the servers automatically copy the process software to each client and then run the installation program for the process software at each client computer. The user executes the program that installs the process software on his client computer (block 822) then exits the process (terminator block 824).

In query step 826, a determination is made whether the process software is to be deployed by sending the process software to users via e-mail. The set of users where the process software will be deployed are identified together with the addresses of the user client computers (block 828). The process software is sent via e-mail to each of the users' client computers (block 830). The users then receive the e-mail (block 832) and then detach the process software from the e-mail to a directory on their client computers (block 834). The user executes the program that installs the process software on his client computer (block 822) then exits the process (terminator block 824).

Lastly a determination is made on whether to the process software will be sent directly to user directories on their client computers (query block 836). If so, the user directories are identified (block 838). The process software is transferred directly to the user's client computer directory (block 840). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 842). The user executes the program that installs the process software on his client computer (block 822) and then exits the process (terminator block 824).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-bee number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called runnel interfaces, where the packet enters and exits the network.

Figure 9A:
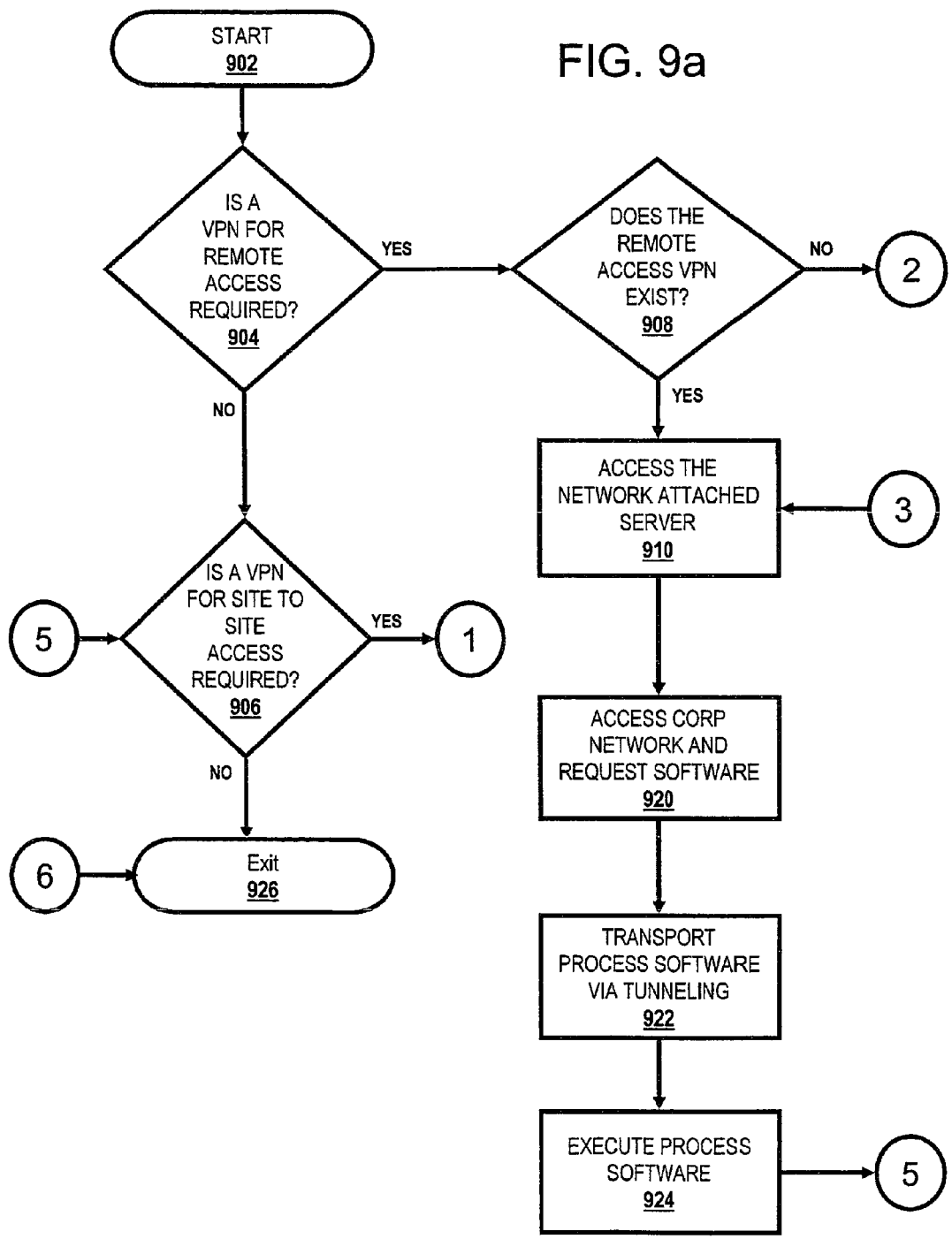
Figure 9C:
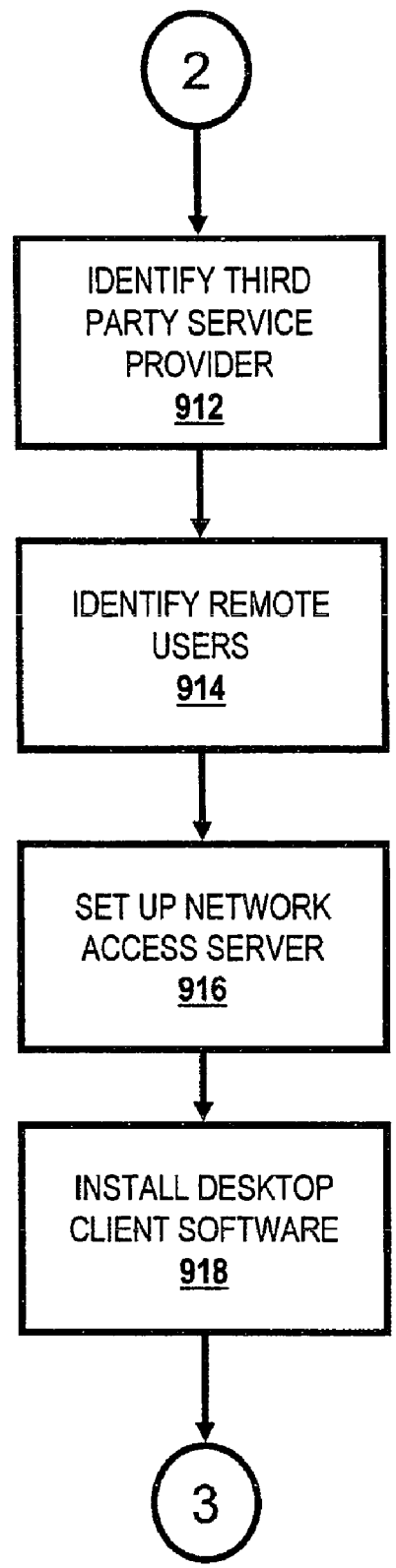

The process for such VPN deployment is described in FIG. 9. Initiator block 902 begins the Virtual Private Network (VPN) process. A determination is made to see if a VPN for remote access is required (query block 904). If it is not required, then proceed to (query block 906). If it is required, then determine if the remote access VPN exists (query block 908).

If a VPN does exist, then proceed to block 910. Otherwise identify a third party provider that will provide the secure, encrypted connections between the company's private network and the company's remote users (block 912). The company's remote users are identified (block 914). The third party provider then sets up a network access server (NAS) (block 916) that allows the remote users to dial a toll free number or attach directly via a broadband modem to access, download and install the desktop client software for the remote-access VPN (block 918).

After the remote access VPN has been built or if it been previously installed, the remote users can access the process software by dialing into the NAS or attaching directly via a cable or DSL modem into the NAS (block 910). This allows entry into the corporate network where the process software is accessed (block 920). The process software is transported to the remote user's desktop over the network via tunneling. That is the process software is divided into packets and each packet including the data and protocol is placed within another packet (block 922). When the process software arrives at the remote user's desk-top, it is removed from the packets, reconstituted and then is executed on the remote users desk-top (block 924).

A determination is then made to see if a VPN for site to site access is required (query block 906). If it is not required, then proceed to exit the process (terminator block 926). Otherwise, determine if the site to site VPN exists (query block 928). If it does exist, then proceed to block 930. Otherwise, install the dedicated equipment required to establish a site to site VPN (block 932). Then build the large scale encryption into the VPN (block 934).

After the site to site VPN has been built or if it had been previously established, the users access the process software via the VPN (block 930). The process software is transported to the site users over the network via tunneling (block 932). That is the process software is divided into packets and each packet including the data and protocol is placed within another packet (block 934). When the process software arrives at the remote user's desktop, it is removed from the packets, reconstituted and is executed on the site users desktop (block 936). The process then ends at terminator block 926.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 10A:
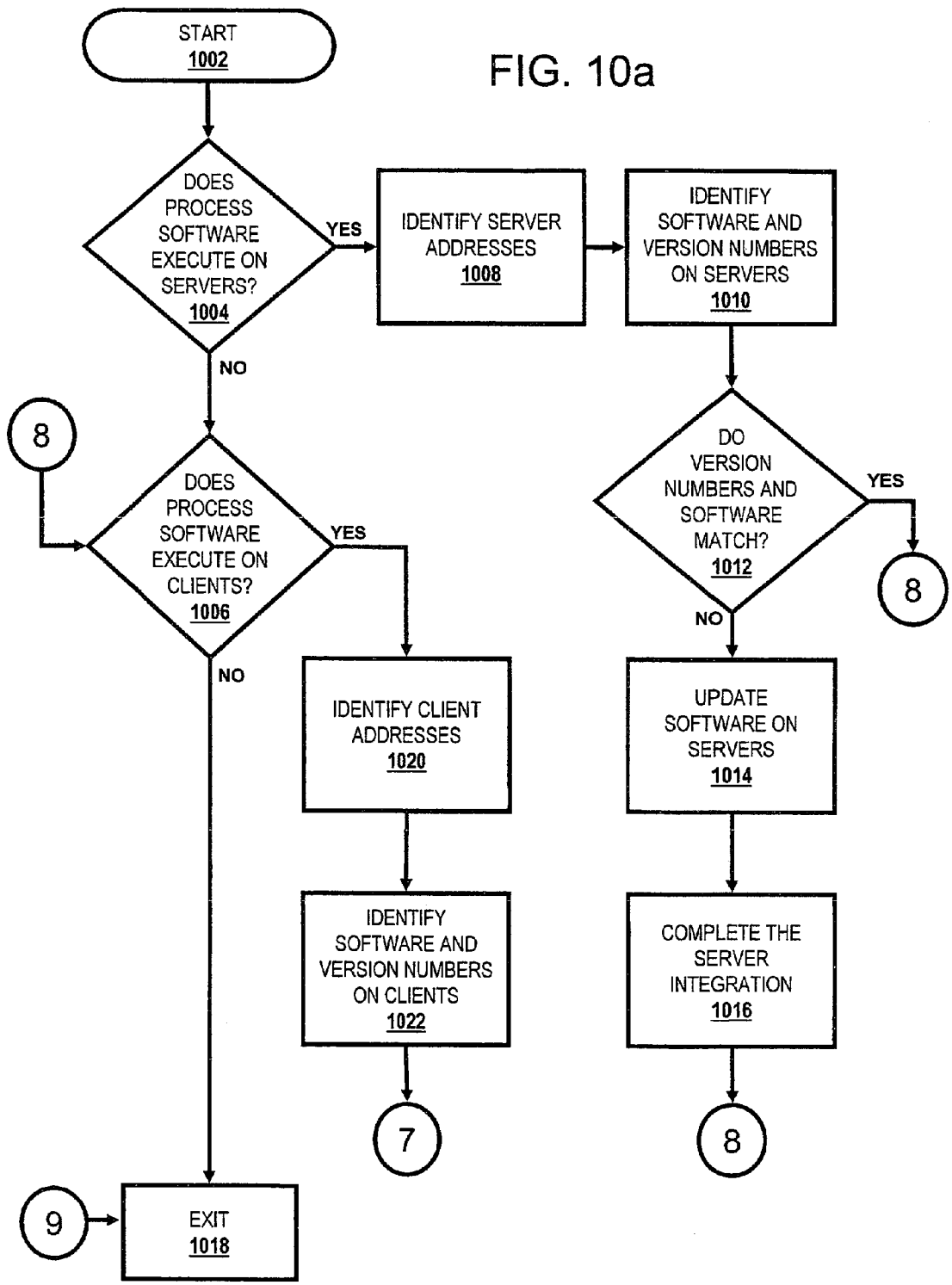
FIGS. 10a-b show a flow-chart showing steps taken to integrate into an computer system software that is capable of executing the steps shown and described in FIG. 6.
Figure 10B:
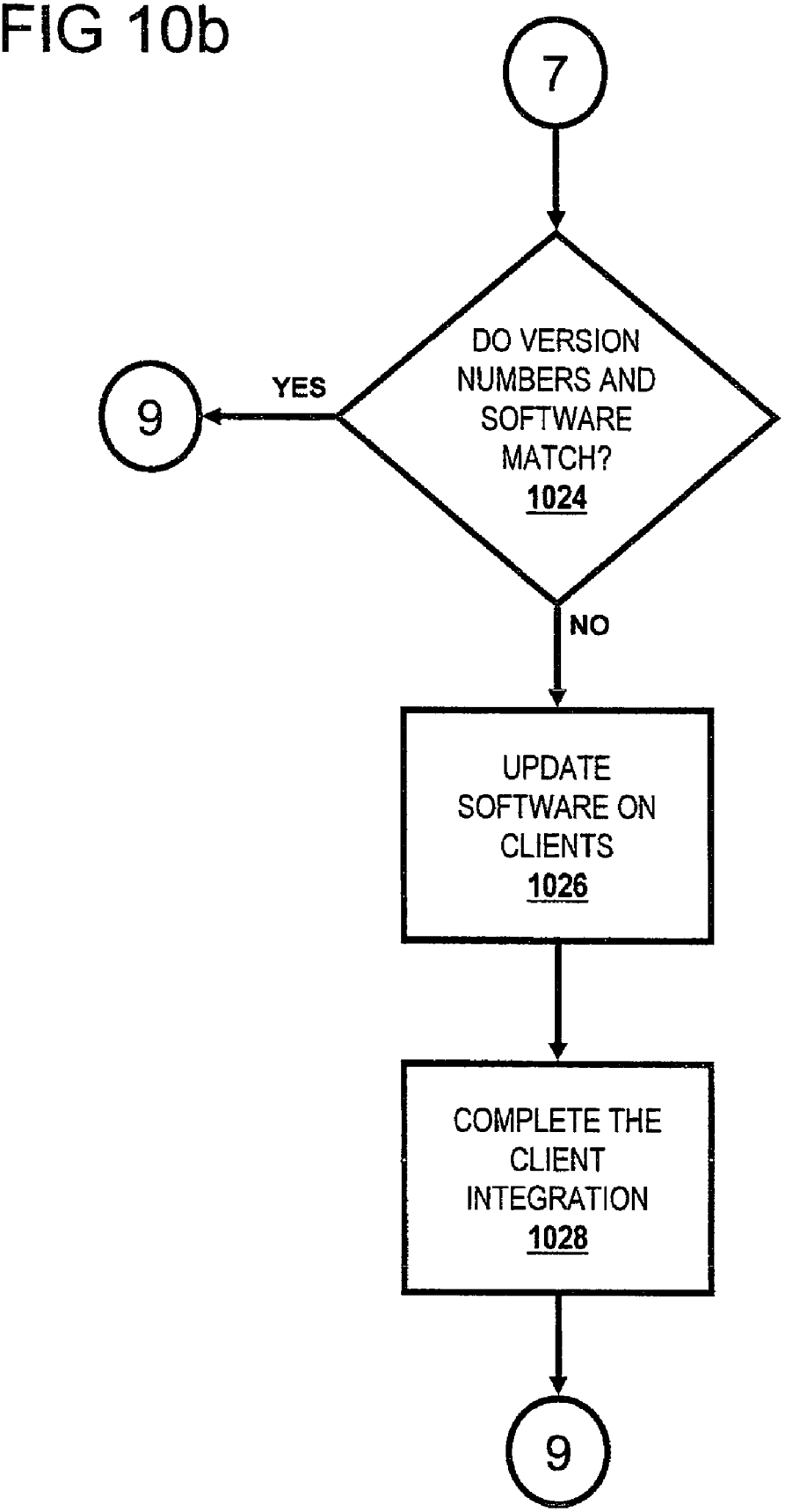

For a high-level description of this process, reference is now made to FIG. 10. Initiator block 1002 begins the integration of the process software. The first tiling is to determine if there are any process software programs that will execute on a server or servers (block 1004). If this is not the case, then integration proceeds to query block 1006. If this is the case, then the server addresses are identified (block 1008). The servers are checked to see if they contain software that includes the operating system (OS), applications, and network operating systems (NOS), together with their version numbers, which have been tested with the process software (block 1010). The servers are also checked to determine if there is any missing software that is required by the process software in block 1010.

A determination is made if the version numbers match the version numbers of OS, applications and NOS that have been tested with the process software (block 1012). If all of the versions match and there is no missing required software the integration continues in query block 1006.

If one or more of the version numbers do not match, then the unmatched versions are updated on the server or servers with the correct versions (block 1014). Additionally, if there is missing required software, then it is updated on the server or servers in the step shown in block 1014. The server integration is completed by installing the process software (block 1016).

The step shown in query block 1006, which follows either the steps shown in block 1004, 1012 or 1016 determines if there are any programs of the process software that will execute on the clients. If no process software programs execute on the clients the integration proceeds to terminator block 1018 and exits. If this not the case, then the client addresses are identified as shown in block 1020.

The clients are checked to see if they contain software that includes the operating system (OS), applications, and network operating systems (NOS), together with their version numbers, which have been tested with the process software (block 1022). The clients are also checked to determine if there is any missing software that is required by the process software in the step described by block 1022.

A determination is made is the version numbers match the version numbers of OS, applications and NOS that have been tested with the process software (query block 1024). If all of the versions match and there is no missing required software, then the integration proceeds to terminator block 1018 and exits.

If one or more of the version numbers do not match, then the unmatched versions are updated on the clients with the correct versions (block 1026). In addition, if there is missing required software then it is updated on the clients (also block 1026). The client integration is completed by installing the process software on the clients (block 1028). The integration proceeds to terminator block 1018 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 11A:
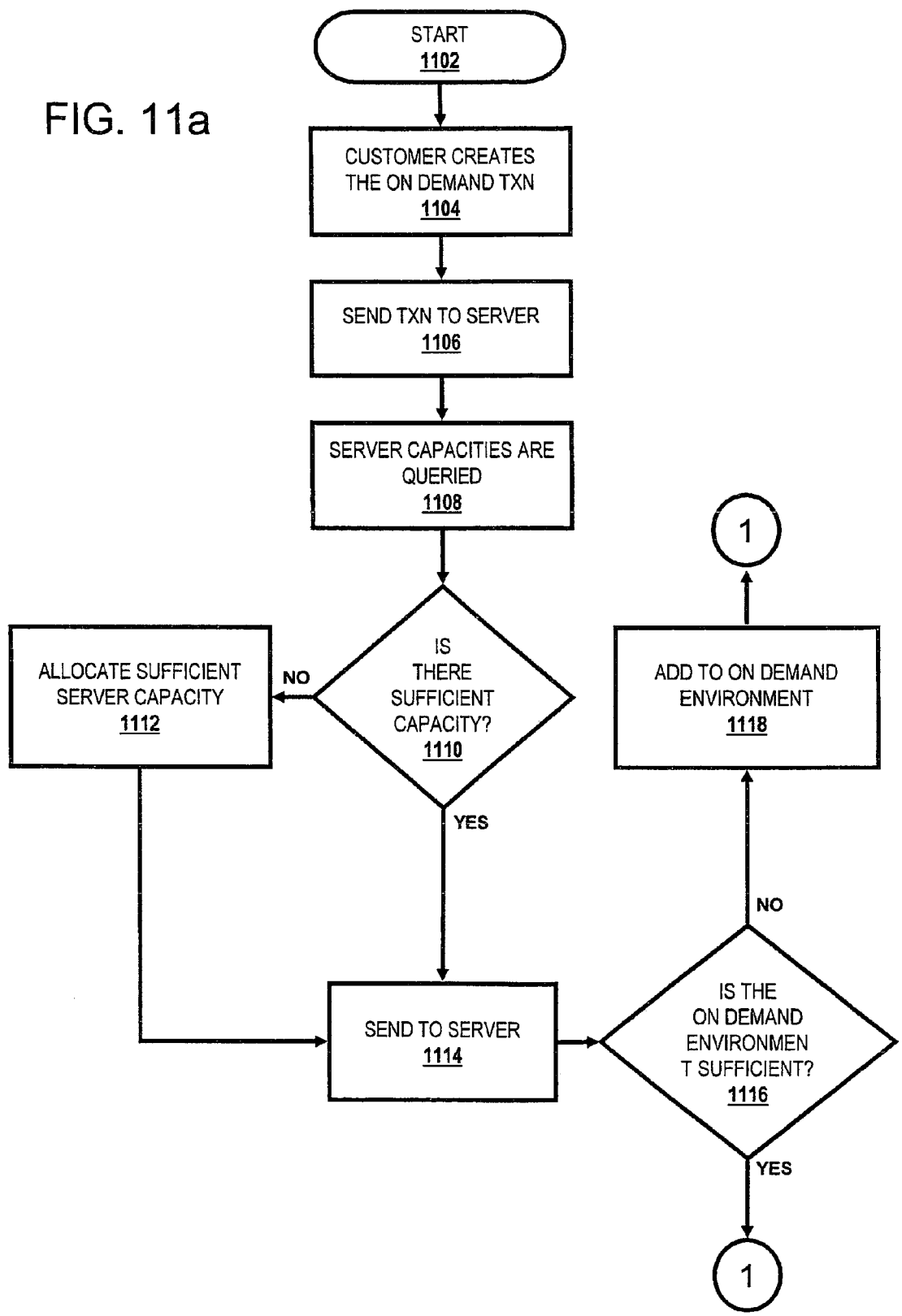

With reference now to FIG. 11, initiator block 1102 begins the On Demand process. A transaction is created than contains the unique customer identification, the requested service type and any service parameters that further, specify the type of service (block 1104). The transaction is then sent to the main server (block 1106). In an On Demand environment the main server can initially be the only server, then as capacity is consumed other servers are added to the On Demand environment.

The server central processing unit-(CPU) capacities in the On Demand environment are queried (block 1108). The CPU requirement of the transaction is estimated, then the servers available CPU capacity in the On Demand environment are compared to the transaction CPU requirement to see if there is sufficient CPU available capacity in any server to process the transaction (query block 1110). If there is not sufficient server CPU available capacity, then additional server CPU capacity is allocated to process the transaction (block 1112). If there was already sufficient Available CPU capacity then the transaction is sent to a selected server (block 1114).

Before executing the transaction, a check is made of the remaining On Demand environment to determine if the environment has sufficient available capacity for processing the transaction. This environment capacity consists of such things as but not limited to network bandwidth, processor memory, storage etc. (block 1116). If there is not sufficient available capacity, then capacity will be added to the On Demand environment (block 1118). Next the required software to process the transaction is accessed, loaded into memory, then the transaction is executed (block 1120).

The usage measurements are recorded (block 1122). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1124).

If the customer has requested that the On Demand costs be posted to a web site (query block 1126), then they are posted (block 1128). If the customer has requested that the On Demand costs be sent via e-mail to a customer address (query block 1130), then these costs are sent to the customer (block 1132). If the customer has requested that the On Demand costs be paid directly from a customer account (query block 1134), then payment is received directly from the customer account (block 1136). The On Demand process is then exited at terminator block 1138.

The presently described method, system and computer-useable medium provides an efficient system for dynamically controlling PCI clocks to PCI cards such as card controllers. Thus, a PCI card can be auto-powered to monitor incoming signals (e.g., data, wake-up signals, control signals, signals that control coordination with other motherboards) to a motherboard that is powered down, thus saving power and heat in a multi-board system. When the motherboard comes back on line (powered on), the presently described invention can be used to automatically cause the PCI card to use the PCI clock signal from the motherboard, thus eliminating the need to manually (either physically in hardware or through the use of software code inputs) turn off the on-board PCI clock signal in the PCI card before using the motherboard's PCI clock signal.

While the invention has been particularly shown and described with reference to a preferred embodiment, it will be understood by those skilled in the art that various changes in form and detail may be made therein without departing from the spirit and scope of the invention. For example, while the invention has been described as being implemented on PCI elements, the method, system and computer-useable medium described herein may also be utilized by any system having a master device (depicted above in exemplary manner as motherboard 406) and a peripheral (e.g., slave) device (depicted above in exemplary manner as PCI card 328). Similarly, while logic signals are described herein and in the claims as being "high" or "low," such designations are understood to be such that a "high" signal may be "low" and a "low" signal may be "high." Likewise, the Boolean logic that has been described as AND or XOR gates may be replaced by other Boolean logic whose output values are adjusted accordingly.

What is claimed is:

1. A system for dynamically controlling a clock signal used by a peripheral device that is coupled to a master device, the system comprising:
    a clock selector having:
        a first clock signal input,
        a second clock signal input,
        a control input, and
        a clock signal output,
    wherein the first clock signal input receives a first clock signal that is generated by a master device that is coupled to a peripheral device,
    and wherein the second clock signal input receives a second clock signal that is generated by the peripheral device,
    and wherein a control signal sent to the control input causes the clock selector to selectively send, via the clock signal output, either the first clock signal or the second clock signal to the peripheral device;
    wherein the clock selector is controlled by a power state of the master device,
    and wherein the clock selector sends the second clock signal to the peripheral device when the master device is powered off,
    and wherein the clock selector sends the first clock signal to the peripheral device when the master device is powered on;
    wherein the clock selector is further controlled by a reset signal from a controller chip in the master device, and wherein the clock selector sends the first clock signal to the peripheral device when the reset signal is active, and wherein the clock selector sends the second clock signal to the peripheral device when the reset signal is inactive.

2. The system of claim 1, wherein the master device is a motherboard that comprises:
   a processing unit;
   a memory; and
   a controller.

3. The system of claim 2, wherein the controller is a Peripheral Component Interconnect (PCI) controller that is capable of asserting a reset signal when the motherboard assumes a master role over the PCI card.

4. The system of claim 3, wherein the peripheral device is a Peripheral Component Interconnect (PCI) card that controls functionality of, and inputs to, the motherboard, and wherein the clock selector selectively sends a clock signal to a PCI bus in the PCI card.

5. The system of claim 4, further comprising:
   a power supply on the motherboard that is capable of asserting a "power on" signal;
   a first Boolean logic coupled to the motherboard, wherein the first Boolean logic outputs a first logical signal that describes if the reset signal and the power on signal are asserted;
   a second Boolean logic coupled to the first Boolean logic, wherein the second Boolean logic has an input that is coupled to an output of the first Boolean logic, and wherein the second Boolean logic outputs a second logical signal based on the first logical signal, and wherein the second logical signal is input into the clock selector; and
   a PCI oscillator coupled to an oscillator signal input in the clock selector, wherein the clock selector outputs to the PCI card a primary PCI clock signal that is generated by the PCI oscillator and the PCI controller on the motherboard when the reset signal has been asserted and the motherboard has been powered on,
   and wherein the clock selector outputs to the PCI card a secondary PCI clock signal that is generated by the PCI oscillator and a PCI controller on the PCI card when the reset signal has not been asserted or the motherboard has not been powered on.

6. A computer-usable storage medium embodying computer program code, the computer program code comprising computer executable instructions configured to:
   couple a slave device to a master device;
   power on the slave device while the master device is powered off, wherein the powered on slave device generates an internal clock signal and wherein the master device is not-powered on while the slave device is initially generating the internal clock signal;
   in response to the master device being powered on, disable the internal clock signal and send the slave device a master clock signal from the master device.

7. The computer-usable storage medium of claim 6, wherein the master clock signal is sent to the slave device only when the master device generates a reset signal to coordinate a timing of all slave devices coupled to the master device.

8. The computer-usable storage medium of claim 6, wherein the master device is a motherboard that comprises a processing unit, a memory, and a Peripheral Component Interconnect (PCI) controller chip.

9. The computer-usable storage medium of claim 8, wherein the slave device is a PCI card that controls the motherboard, and wherein either the master clock signal or the internal clock signal controls a timing of a PCI bus in the PCI controller card.

10. The computer-usable storage medium of claim 9, wherein the method further comprises one or more of:
    asserting, by a PCI controller on the motherboard, a reset signal when the motherboard assumes a master role over the PCI card; and
    asserting, by a power supply on the motherboard, a "power on" signal when the motherboard is powered on;
    outputting, from a first Boolean logic, a first logical signal that describes if the reset signal and the power on signal are asserted;
    outputting, from a second Boolean logic that is coupled to the first Boolean logic, a second logical signal that is based on the first logical signal; and
    inputting a PCI oscillator into the clock selector, wherein the clock selector outputs to the PCI card a primary PCI clock signal that is generated, by the PCI oscillator and the PCI controller on the motherboard, when the reset signal has been asserted and the motherboard has been powered on, as described by the second logical signal,
    and wherein the clock selector outputs to the PCI card a secondary PCI clock signal that is generated by the PCI oscillator and a PCI controller on the PCI card, when the reset signal has not been asserted or the motherboard has not been powered on, as described by the second logical signal.

11. The computer-usable storage medium of claim 6, wherein the computer executable instructions are deployable to a client computer from a server at a remote location.

12. The computer-usable storage medium of claim 6, wherein the computer executable instructions are provided by a service provider to a customer on an on-demand basis.

13. The computer-usable storage medium of claim 9, wherein the method further comprises one or more of:
    asserting, by a PCI controller on the motherboard, a reset signal when the motherboard assumes a master role over the PCI card; and
    asserting, by a power supply on the motherboard, a "power on" signal when the motherboard is powered on.

14. The computer-usable storage medium of claim 9, wherein the method further comprises one or more of:
    outputting, from a first Boolean logic, a first logical signal that describes if the reset signal and the power on signal are asserted;
    outputting, from a second Boolean logic that is coupled to the first Boolean logic, a second logical signal that is based on the first logical signal; and
    inputting a PCI oscillator into the clock selector, wherein the clock selector outputs to the PCI card a primary PCI clock signal that is generated, by the PCI oscillator and a PCI controller on the motherboard, when the reset signal has been asserted and the motherboard has been powered on, as described by the second logical signal,
    and wherein the clock selector outputs to the PCI card a secondary PCI clock signal that is generated by the PCI oscillator and a PCI controller on the PCI card, when the reset signal has not been asserted or the motherboard has not been powered on, as described by the second logical signal.

15. A system for dynamically controlling a clock signal used by a peripheral device that is coupled to a master device, the system comprising:
    a clock selector having:
       a first clock signal input,
       a second clock signal input,
       a control input, and
       a clock signal output,
    wherein the first clock signal input receives a first clock signal that is generated by a master device that is coupled to a peripheral device;

wherein the second clock signal input receives a second clock signal that is generated by the peripheral device;

wherein a control signal sent to the control input causes the clock selector to selectively send, via the clock signal output, either the first clock signal or the second clock signal to the peripheral device;

wherein the clock selector is controlled by a power state of the master device, which power state is separate from a power state of the peripheral device;

wherein the clock selector sends the second clock signal to the peripheral device when the master device is powered off; and wherein the clock selector sends the first clock signal to the peripheral device when the master device is powered on.

16. The system of claim 15, further comprising:

wherein the clock selector is further controlled by a reset signal from a controller chip in the master device;

wherein the clock selector sends the first clock signal to the peripheral device when the reset signal is active; and wherein the clock selector sends the second clock signal to the peripheral device when the reset signal is inactive.

17. The system of claim 15, wherein the master device is a motherboard that comprises:
 a processing unit;
 a memory; and
 a controller.

18. The system of claim 17, wherein the controller is a Peripheral Component Interconnect (PCI) controller that is capable of asserting a reset signal when the motherboard assumes a master role over the PCI card.

19. The system of claim 18, wherein the peripheral device is a Peripheral Component Interconnect (PCI) card that controls functionality of, and inputs to, the motherboard, and wherein the clock selector selectively sends a clock signal to a PCI bus in the PCI card.

20. The system of claim 19, further comprising:
 a power supply on the motherboard that is capable of asserting a "power on" signal;
 a first Boolean logic coupled to the motherboard, wherein the first Boolean logic outputs a first logical signal that describes if the reset signal and the power on signal are asserted;
 a second Boolean logic coupled to the first Boolean logic, wherein the second Boolean logic has an input that is coupled to an output of the first Boolean logic, and wherein the second Boolean logic outputs a second logical signal based on the first logical signal, and wherein the second logical signal is input into the clock selector; and
 a PCI oscillator coupled to an oscillator signal input in the clock selector, wherein the clock selector outputs to the PCI card a primary PCI clock signal that is generated by the PCI oscillator and the PCI controller on the motherboard when the reset signal has been asserted and the motherboard has been powered on;

wherein the clock selector outputs to the PCI card a secondary PCI clock signal that is generated by the PCI oscillator and a PCI controller on the PCI card when the reset signal has not been asserted or the motherboard has not been powered on.

* * * * *